Feb. 16, 1960 R. E. MAURER 2,925,339
CONTINUOUS PRESCREENING OF PHOTOGRAPHIC FILM AND PAPER
Filed Sept. 30, 1955 7 Sheets-Sheet 1
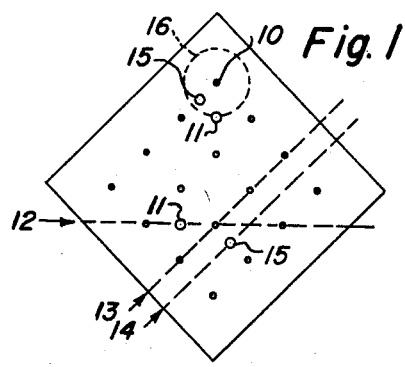
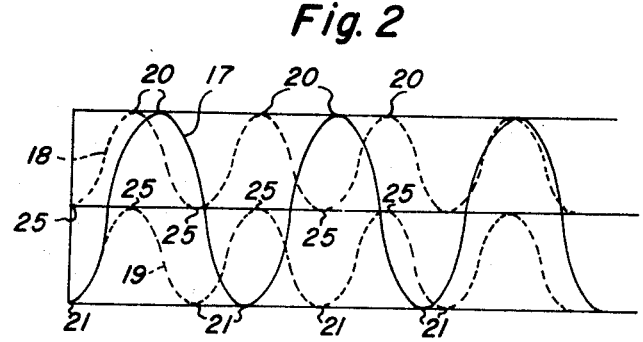
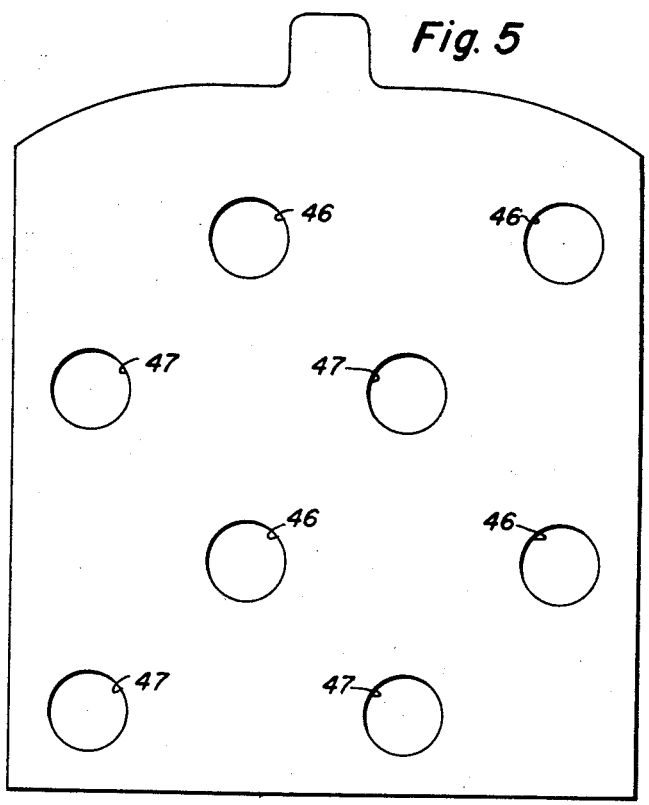
RICHARD E. MAURER
INVENTOR.
BY
ATTORNEYS

RICHARD E. MAURER
INVENTOR.

ATTORNEYS

RICHARD E. MAURER
INVENTOR.

Feb. 16, 1960 R. E. MAURER 2,925,339
CONTINUOUS PRESCREENING OF PHOTOGRAPHIC FILM AND PAPER
Filed Sept. 30, 1955 7 Sheets-Sheet 4

RICHARD E. MAURER
INVENTOR.
BY
ATTORNEYS

Feb. 16, 1960
R. E. MAURER
2,925,339
CONTINUOUS PRESCREENING OF PHOTOGRAPHIC FILM AND PAPER
Filed Sept. 30, 1955
7 Sheets-Sheet 5
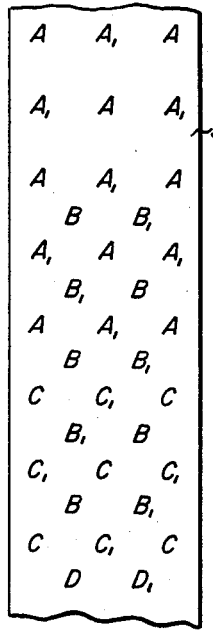
Fig. 17
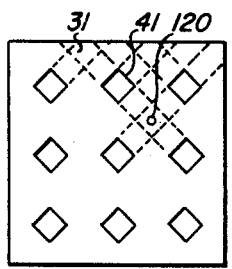
Fig. 20
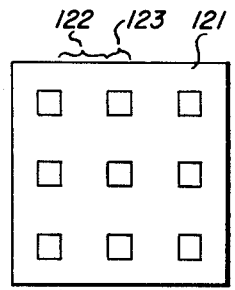
Fig. 21
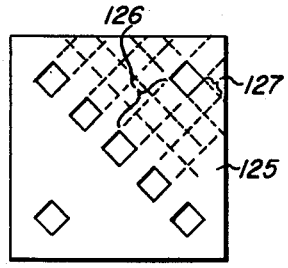
Fig. 22
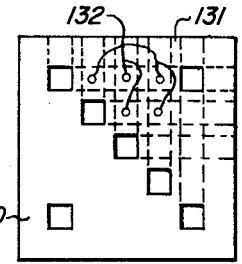
Fig. 23
Fig. 18
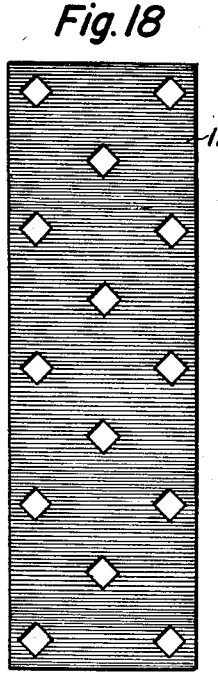
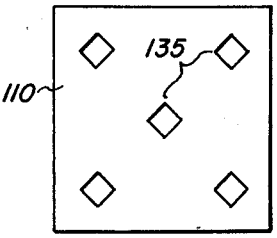
Fig. 24
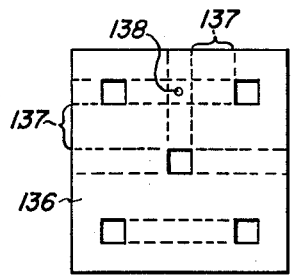
Fig. 25
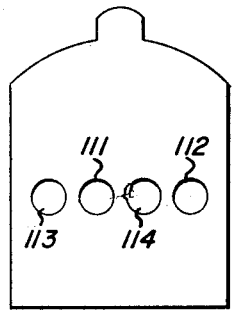
Fig. 19
RICHARD E. MAURER
INVENTOR.
BY
ATTORNEYS Feb. 16, 1960  R. E. MAURER  2,925,339
CONTINUOUS PRESCREENING OF PHOTOGRAPHIC FILM AND PAPER
Filed Sept. 30, 1955  7 Sheets-Sheet 6

RICHARD E. MAURER
INVENTOR.
BY
ATTORNEYS

RICHARD E. MAURER
INVENTOR.

ATTORNEYS

United States Patent Office 2,925,339
Patented Feb. 16, 1960

2,925,339

CONTINUOUS PRESCREENING OF PHOTOGRAPHIC FILM AND PAPER

Richard E. Maurer, Rochester, N.Y., assignor to Eastman Kodak Company, Rochester, N.Y., a corporation of New Jersey Application September 30, 1955, Serial No. 537,749

6 Claims. (Cl. 96—45)

This invention relates to prescreened photographic material such as prescreened film or prescreened paper. Certain methods of prescreening film or paper involve exposure through a halftone screen. For example, Clayden exposure is given in the process described in U.S. Patent 2,691,586, Yule et al. and longer duration, but quite high intensity exposures are described in U.S. Patent 2,691,583, Maurer. Also, ordinary exposures (medium duration, medium intensity) are discussed in the process of my copending application Serial No. 519,355, filed July 1, 1955, now Patent Number 2,805,157.

Since it is impractical to apply Clayden exposures continuously, the present invention is most needed with Clayden prescreening, but it is also applicable to other types of prescreening involving halftone exposure of the film or paper.

The object of the invention is to provide a prescreened method which is effectively continuous. Actually, it is a step-and-repeat process for exposing the photographic material as it comes from a roll. However, a simple step-and-repeat process with juxtaposed exposure areas would in practice cause a line of demarcation between successive areas which, of course, would be extremely detrimental in any prescreened material. The present invention involves an interlacing of the dot exposures in a manner which eliminates all lines of demarcation.

One of the difficulties in continuous Clayden prescreening arises from the fact that two successive Clayden exposures generally give less effect than the same total amount of exposure given at one time and in some cases give less effect than either exposure alone. That is, the second Clayden exposure may even tend to reduce the effect of the first, particularly when both exposures are quite intense.

Accordingly, one of the objects of the present invention is to provide an exposure system in which the overlapping of successive exposures is substantially uniform throughout the film or paper. Also at the edges where there is a tendency toward non-uniformity, this tendency is reduced to a minimum.

Certain embodiments of the invention have certain special advantages or objects. The halftone screen used for making the prescreening exposure is not of the normal type and the particular form of screen used in certain embodiments is easier to manufacture than those used in other embodiments. Many of the embodiments of the invention require the successive or alternate exposures to be from different light sources (apertures or sets of apertures) offset from one another, but some embodiments have the advantage of being able to use the same aperture or set of apertures for each exposure. These latter embodiments have the additional advantage that the lines of demarcation are eliminated completely as long as registration of successive steps is precise, but this is gained at the expense of a tendency to show a directional effect on the prescreening. One embodiment of the invention eliminates or minimizes this directional effect which would cause the screening to be elliptical, but on the other hand elliptical screening is often considered to be an advantage rather than a disadvantage.

All embodiments of the invention have the common object of providing effectively continuous prescreening by a step-and-repeat exposure method without lines of demarcation between the exposure areas. This is obtained essentially by moving the photographic material from a roll step-and-repeat with exactly 50% overlap past an exposure area at which half of the dots are exposed each step. The process will work with ⅔ overlap (⅓ of the dots at a time) or with ¾ overlap (¼ of the dots at a time) but there is no advantage in going beyond 50% overlap, which is by far the simplest arrangement from a practical point of view. At each step, the exposure area is illuminated through a halftone screen to expose only one-half of the dots if the exposure area is an even number of dots wide or approximately one-half of the dots if an extra column or row of dots is included in alternate exposures. Each step exposes dots midway between those of the preceding and succeeding steps. The width of the exposure is defined by the width of the film or paper or by the width of the halftone screen whichever is narrower. The length of the exposure area is defined by the length of the screen which transmits light to the exposure area.

An example of "step and repeat with 50% overlap" is an area two feet long moved lengthwise in steps of one foot. Obviously at each step, the area still overlaps 50% of the previous step. If the steps were only one inch long, there would be about 96% overlap and if the steps were two feet long or longer, there would be no overlap.

When the length of the exposure area includes an even number of dots and sometimes when it includes an odd number of dots, the successive exposures have to be made from different apertures or sets of apertures offset from one another so as to insure that the dots in each step are midway between those of the preceding and succeeding steps. On the other hand, in some systems in which an odd number of rows of dots are included, the successive exposures may be through the same aperture plane since the movement of the film between steps insures that the dots for each step are midway between those of the preceding or succeeding steps.

A full description of these latter systems in which the same aperture or set of apertures is used for every exposure requires the definition of certain terms. A halftone dot pattern may be considered as rows and columns of dots at right angles. The term "principal row" is used to refer to a row of dots, a column of dots or a diagonal row of dots. The principal rows which constitute rows and columns are orthogonal to the dot pattern. The other principal rows are diagonal rows. As is well known, the "corners" of the dots are on the diagonal rows midway between the centers of the dots.

Except in certain embodiments of the invention in which two or more dots are exposed through each opening in a ruled halftone screen, the halftone screen may be either a ruled screen or a contact screen. However, the screen has only half the normal number of openings (or in the two-dots-through-each-opening embodiments one-quarter the normal number of openings) for the fineness of the screen being produced. That is, to produce a dot prescreening of say N lines per inch a halftone screen is used which has only $$\frac{N^2}{2}$$

elements per square inch. A normal ruled halftone screen has each opening with about ¼ the area of the element or about ⅓ of the area of the opaque rulings. In the simplest form of the present invention these openings are about ⅛ of the area of the element, i.e., about ½ the area of the opaque rulings. In the embodiments of the invention in which the number of dots are doubled at each exposure, the openings are about 1/16 of the area of the element which is about 1/15 the area of the opaque rulings.

The operation of the invention and the various embodiments thereof will be more fully understood from the following description when read in connection with the accompanying drawings, in which:

Fig. 1 is a diagram to explain the parts of a halftone pattern;

Fig. 2 graphically illustrates the density distribution in a vignetted halftone pattern or the brightness distribution at an emusion layer spaced the standard screen distance from an ordinary ruled halftone screen (along lines at different angles);

Figs. 4, 5 and 6 illustrate the aperture plates for use with various embodiments of the invention;

Figure 4:
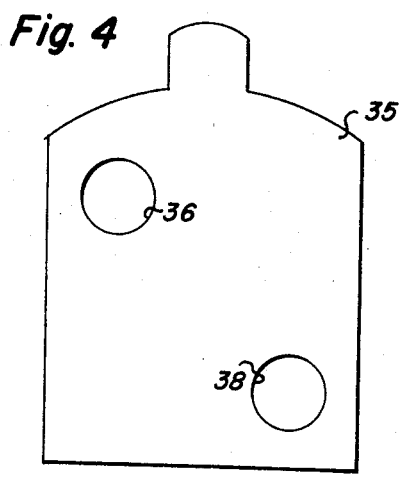
Figure 7:
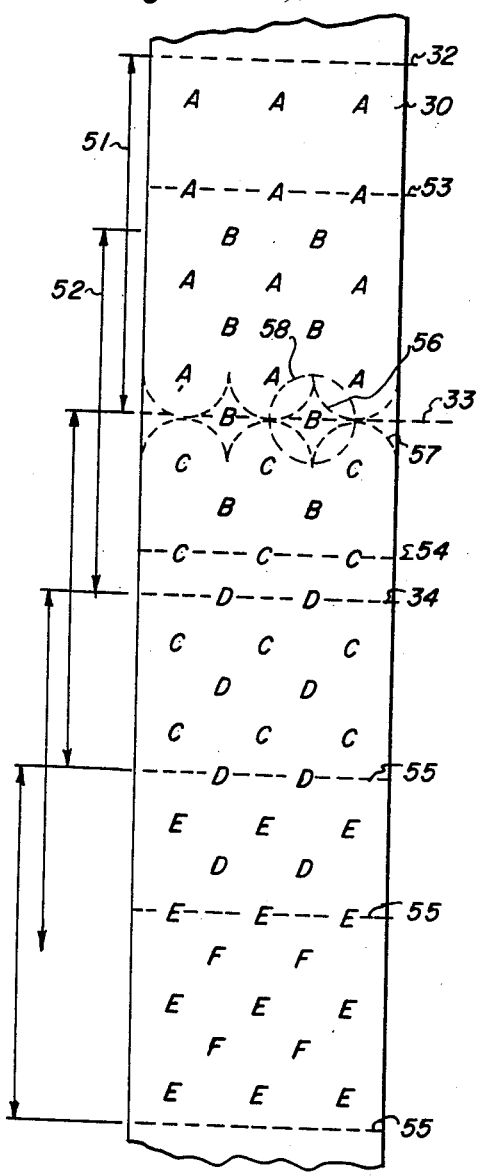
Figs. 7 and 8 illustrate schematically embodiments of the invention in which successive steps include respectively an even number of dots and an odd number of dots in the exposure area.
Figure 26:
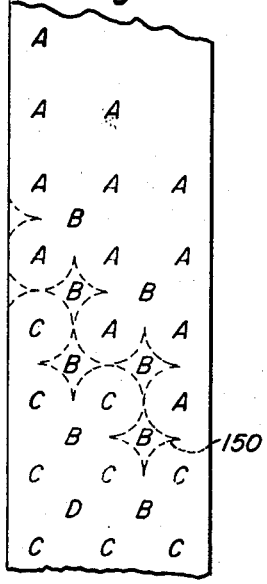
Figure 29:
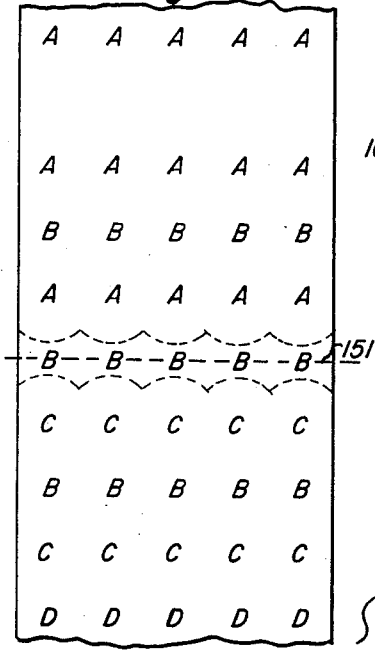
Figure 31:
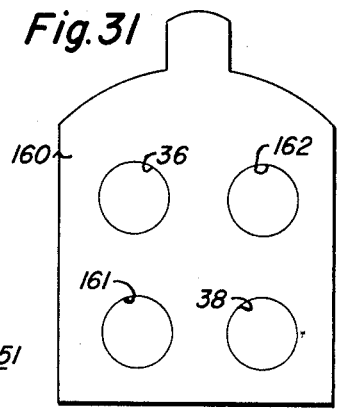
Figure 27:
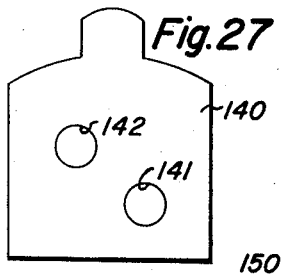
Figure 30:
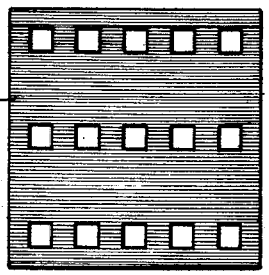
Figure 28:
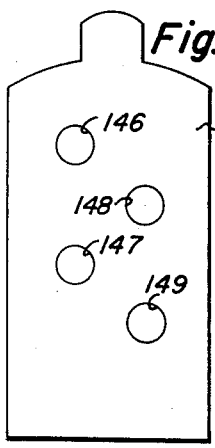
Figure 32:
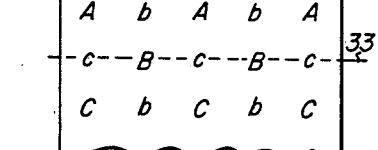
Figure 33:
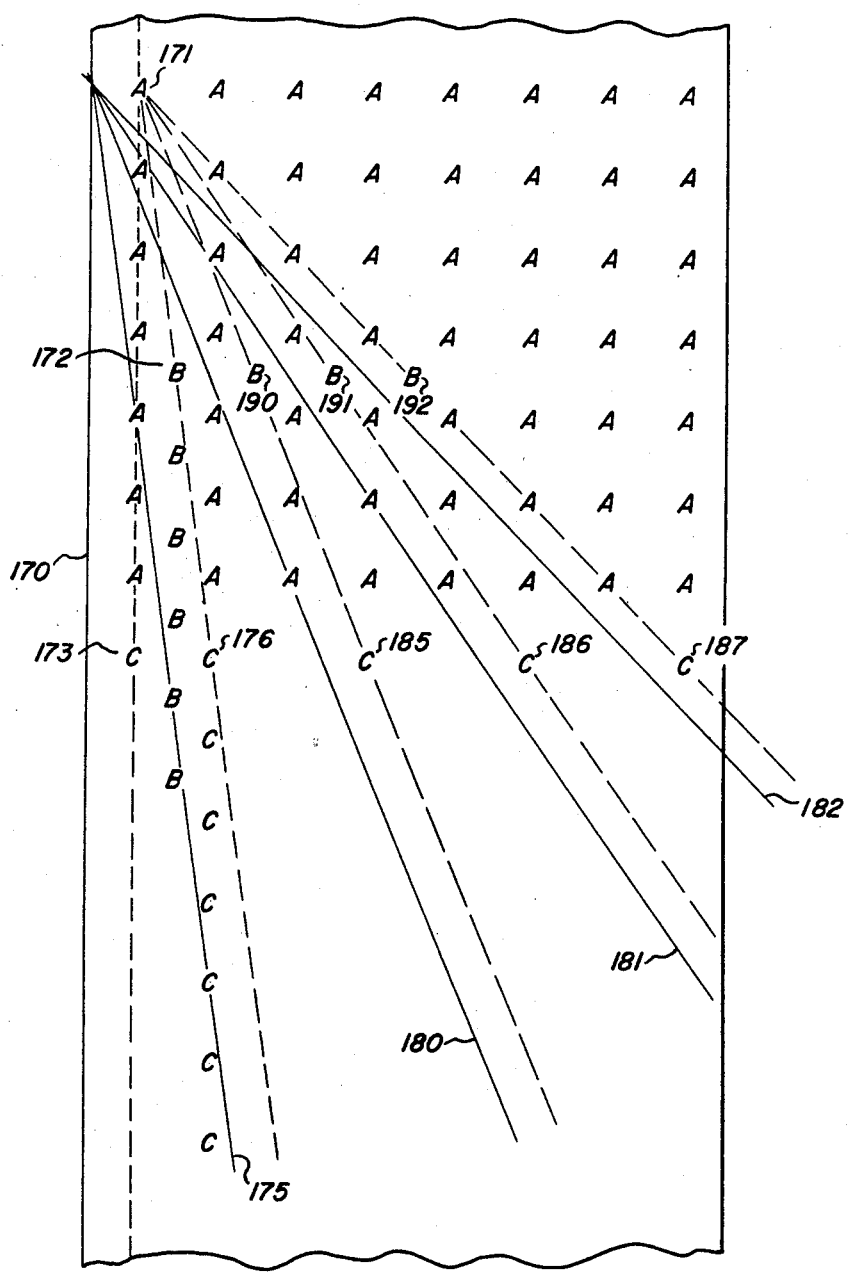

Figs. 13 to 16 similarly illustrate the film, the screen and the alternative apertures for an embodiment involving an odd number of rows of dots in the exposure area;

Figs. 17, 18 and 19 similarly illustrate the film, the screen and the exposure apertures for an embodiment of the invention in which two dots are simultaneously exposed through each opening in the halftone screen;

Figs. 20 to 25 illustrate the forms of halftone screens used in various embodiments of the invention;

Figs. 26, 27 and 28 illustrate the film and alternative forms of apertures for another embodiment of the invention;

Figs. 29 and 30 illustrate the film and the halftone screen for still another embodiment of the invention;

Figs. 31 and 32 show modified forms of Figs. 4 and 7 respectively to permit the combination of hypersensitizing with Clayden desensitizing forms of prescreening;

Fig. 33 illustrates schematically the advantages of step-and-repeat movement of the film in directions other than along a principal row of the dot pattern.

In Fig. 1 the black dots 10 represent the centers of the dots in a halftone pattern. The corners of the dots are labeled 11. If Fig. 1 is considered to represent a contact halftone screen, the points 10 and 11 represent the extremes in density, the maximum and minimum densities. If Fig. 1 is taken to represent the brightness distribution at a photographic film or plate located the standard screen distance behind a ruled halftone screen, the points 10 and 11 represent the extremes in brightness of the illumination coming through the screen. The points 15 which are half way between adjacent centers or half way between adjacent corners of the dots represent medium density or brightness. For the remainder of this description of Fig. 1, it will be considered as representing a contact halftone screen of varying density.

In discussing directions across a halftone screen, the principal directions are those orthogonal to the dot patterns such as indicated by the broken line 13 or lines at right angles thereto and directions at 45° to the orthogonal directions such as indicated by the broken line 12 which passes through centers and corners of the dots.

In Fig. 2 the density distribution along the line 12 of Fig. 1, is represented by the curve 17. The centers 10 of the dots have densities 20 represented by the tops of the curve 17 and the corners 11 have minimum density 21 as represented by the bottoms of the curve 17. It will be noted that density distribution in a halftone screen is usually drawn with respect to diagonal rows such as 12. It is less usual to draw the density distribution along the principal rows which are orthogonal to the dot pattern such as the row 13 at 45° to the line 12. However, the density for the row 13 is indicated by the curve 18 in Fig. 2. Again the maximum density is 20 and the minimum density is 25, which is the density at the points 15. A line 14 drawn through adjacent corners of dots has a density distribution represented by the curve 19 in Fig. 2 with maximum densities 25 and minimum densities 21.

A prescreening exposure through an ordinary halftone screen whether it is a Clayden exposure or an ordinary long exposure will have an intensity distribution represented by the curves shown in Fig. 2. When the prescreening exposure is of exactly the correct value, the effect of the exposure at any dot 10 falls off to zero at the corner 11 and at all points along a circle 16 at this same distance from the dot 10. Thus there is a slight overlap effect of two adjacent dots at points 15 midway between the dots, since each point 15 lies within the circles of both adjacent dots. Excessive and insufficient exposures respectively correspond to larger and smaller limiting circles around each dot.

Figure 3:
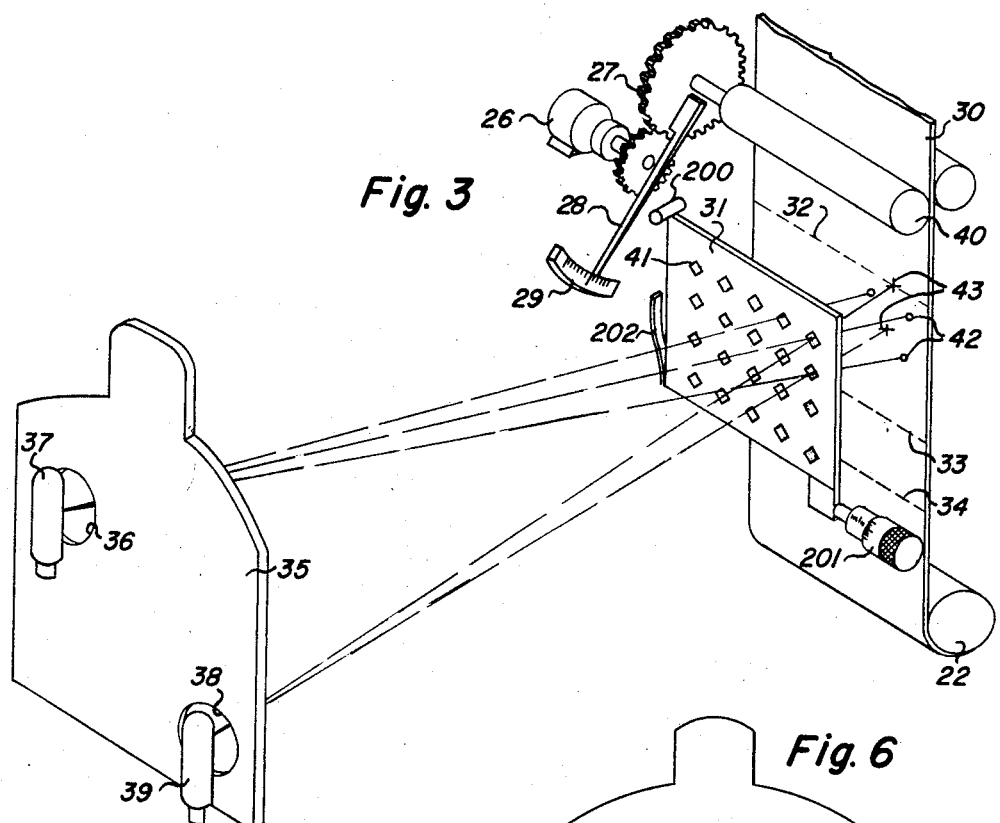
Fig. 3 illustrates schematically the prescreening of photographic film or paper according to the present invention.

In Fig. 3 a photographic film or paper 30 is moved step-and-repeat from a roll 22 past an exposure area, the end limits of which are represented approximately by broken lines 32 an 33. At each step there is a 50% overlap so that the broken line 34 moves up to the position of the line 33 before the next exposure. Precise metering of the material is provided by a suitable drive means indicated schematically as drive rolls 40 operated by a motor 26 through gears 27. A long pointer 28 carried by the gear on the shaft of the roll 40 may be used to check (and correct) against a scale 29, the precision of the rotation of the roll 40. Any of the well known precision metering devices may be used or the rolls may be turned by hand. In large scale production the system of metering is checked only occasionally, but may be checked more often if desired by edge marking the film and examining the marks by a measuring microscope. Such techniques for precise metering are all well known. The exposure area is located at the standard screen distance behind a ruled halftone screen 31 which has openings 41 through which the screening exposures are given. The screen 31 is, in general, not a standard ruled screen, but is similar thereto with half of the apertures blacked out (or in some embodiments discussed below, with ¾ of the apertures blacked out). Of course, the film 30 is protected from all exposure except at the exposure area by a suitable housing which is omitted from Fig. 3 for clarity.

The screen 31 is shown pivoted at the point 200 to permit angular adjustment whose effect is discussed in connection with Fig. 33. A micrometer 201 rotates the screen against the pressure of a spring 202 and thus provides the precise adjustment required for the feature of Fig. 33.

In some embodiments of the invention the successive exposures are from different light sources or from different apertures in an aperture plate 35. In the arrangement shown in Fig. 3 there are two such apertures 36 and 38. For the first step of the step-and-repeat system, the lamp 37 is turned on (or flashed, if a Clayden exposure is to be given), and the light through the aperture 36 illuminates dots 42 in the exposure plane through openings 41 in the screen 31. The film is then moved to the next step with 50% overlap and the lamp 39 is turned on or flashed to illuminate areas 43 midway between the areas 42 of the previous (and succeeding) exposures.

Since there are an even number of rows of openings between the top and bottom of the screen 31 and hence an even number of rows of dots exposed at the exposure area between the lines 32 and 33 for each step, the apertures 36 and 38 are located on a diagonal when viewed from the front as shown in Fig. 4, so as to offset the dots properly in the exposure plane. In order to increase the intensity of exposure, the single aperture 36 may be replaced by four apertures 46 and the single aperture 38 may be replaced by four apertures 47 in an aperture plate 45 as shown in Fig. 5. In Fig. 3 the even number of rows of dots or screen openings is illustrated as 4, but this may vary all the way from two such rows up to several thousand, if a large area is to be exposed at each step. In all of the drawings four rows are used to represent an "even" screen and three or five rows are used to represent an "odd" screen. The operation of the invention is not affected by the number of columns of screen openings. Five such columns are illustrated in Fig. 3. The width of the film 30 may be such that it receives five columns of dots at one exposure and only four columns of dots at the next. However, in practice there are actually several thousand columns of dots and hence the presence or absence of a single column does not appreciably affect the statement that half of the dots are exposed at each step.

Figure 6:
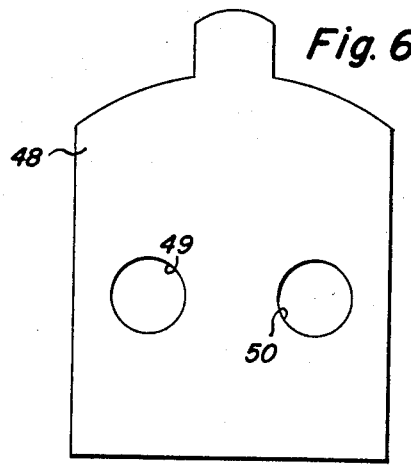

If an odd number of rows of dots are exposed in the system shown in Fig. 3, the successive exposure steps require the apertures to be offset vertically or horizontally as shown in aperture plate 48 of Fig. 6, rather than diagonally. The first exposure through the aperture 49 exposes half of the dots and the length of the exposure area is such that advancing the film half of this length brings the points on the film which are midway between the previously exposed dots horizontally in line with the holes in the screen and the aperture 50. If one wished to move the film different distances for alternate steps (which is unlikely but possible) the apertures could be offset accordingly.

The difference between an even number of rows and an odd number of rows is best explained in connection with Figs. 7 and 8 which illustrate the exposures on the film 30 in both cases.

In Fig. 7 the dots exposed at the first exposure are represented by the points A. During this exposure, the upper and lower edges of the exposure frame are represented by the lines 32 and 33, and the height of the frame is represented by the double-headed arrow 51. When the film is moved up to bring the part represented by the doubleheaded arrow 52 and the lower limit 34 behind the exposure frame, the lower two rows of dots A are now in the position of the upper two rows of openings in the screen. Thus, a second exposure through the same aperture 36 of Fig. 4 would re-expose these dots rather than the areas midway between. It is for this reason that the exposure is given by the aperture 38. With respect to this aperture 38, the upper and lower edges of the screen correspond to the lines 53 and 54 and the dots exposed are those labeled B. The third, fourth, fifth and sixth exposures are represented by dots C, D, E and F. The doubleheaded arrows on the left of Fig. 7 represent the step-and-repeat process with exactly 50% overlap. The lines 55 indicate the lines on the film which correspond to the lower edge of the exposure frame at each step.

Figure 8:
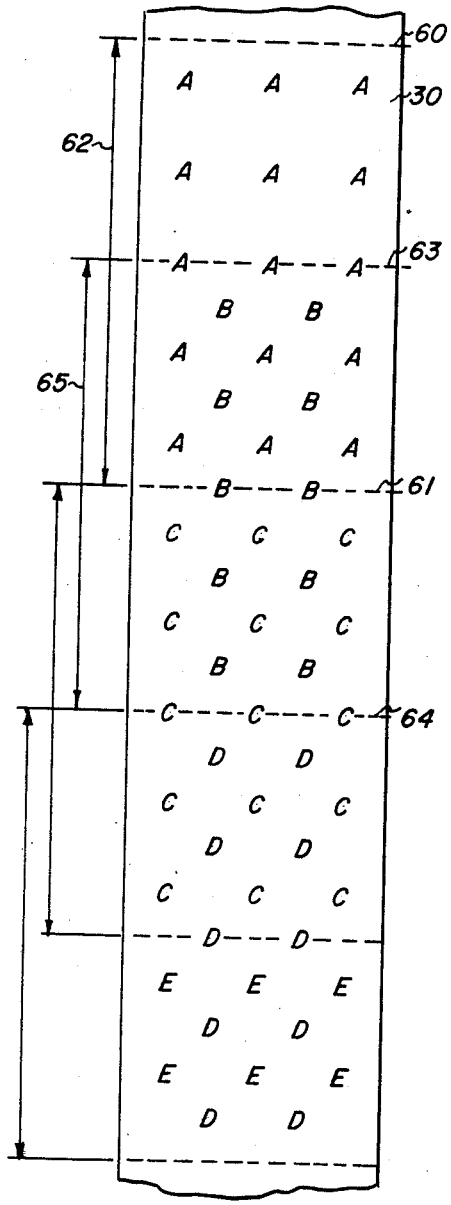

Fig. 8 illustrates the same operation when an odd number of rows of dots are exposed at each step. The exposure frame 62 between lines 60 and 61 includes five rows of dots labeled A. The next step brings the exposure frame to the point represented by the doubleheaded arrow 65 between lines 63 and 64. The rows of dots B are located at exactly the same distance between the tops and bottoms of the doubleheaded arrow 65 as the dots A with respect to the arrows 62. However, the dots B are offset horizontally. Hence, it is necessary to use the apertures 49 and 50 of Fig. 6 for the successive exposures in this case. If this is not fully understood, it should be noted that the line 63 passes through the middle row of dots in the exposure frame 62. When one moves to the exposure frame 63, there is still a row of dots 61 in the exact middle of this frame. Therefore, the exposure apertures should be at the same horizontal level to expose the dots B as to expose the dots A. However, when one uses an even number of dots as in Fig. 7, there is no row of A dots in the middle of the frame 51, but there is a row of B dots in the middle of the frame 52.

Since the purpose of the invention is to eliminate the line of demarcation between successive exposures, the effect at the lines of demarcation such as the line 33 in Fig. 7 will now be considered. As far as the B exposures are concerned, this is not a line of demarcation. It is only a line between the A and C exposures. The effect of the A exposures reaches only to the line 56 and the effect of the C exposures reaches only to the line 57. Thus, along the line 33 there is no effect of the A and C exposures. Thus, there is no line of demarcation exactly on the line 33. The circle 58 represents the extreme limit of the effect of the exposure B of one of the dots on the line 33. There are some areas between the circle 58 and the borders 56 and 57 of the A and C exposures. However, this effect is uniformly distributed throughout the material; it is exactly the same whether a B dot is between four A dots or between two A and two C dots, (or an A dot surrounded by four B dots). In fact one can go one step further in the theory of what happens and point out that even if the A and C exposures are excessive (which is unlikely) so that circles 56 and 57 overlap, the effect is not detrimental. All that would happen would be some exposure at the very corners of the exposures (centers of the ultimate dots) and even if this were different along the line 33 than elsewhere on the film, the only change would be in the size of the shadow dots when the film is used as a negative, and this would be hardly discernible, if at all. In practice these latter conditions do not occur, and thus, as first pointed out, there is no line of demarcation between the A and C exposures.

It will be noted from the above that the various embodiments of the invention can be discussed in terms of charts such as Figs. 7 and 8 with reference to a screen and an aperture plate, it being realized that a single aperture may be replaced by a plurality of apertures as in Fig. 5. The remaining figures will all be discussed in this manner.

Figure 9:
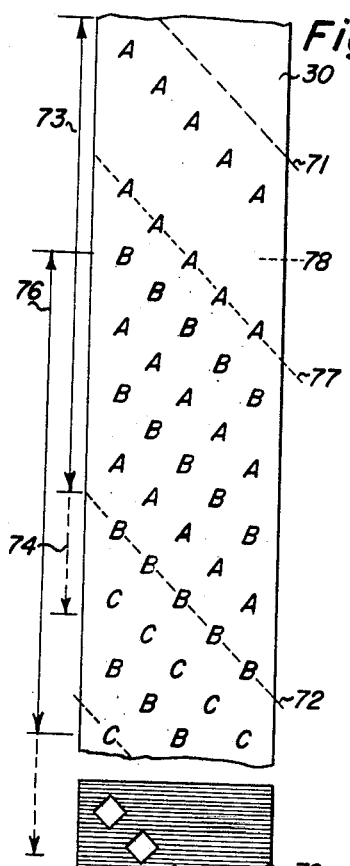
Fig. 9 illustrates a different embodiment of the invention involving an even number of dots in the exposure area.
Figure 11:
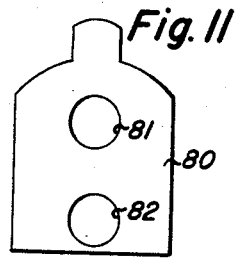
Figs. 11 and 12 illustrate alternative forms of exposure apertures for use with the screen shown in Fig. 10.
Figure 12:
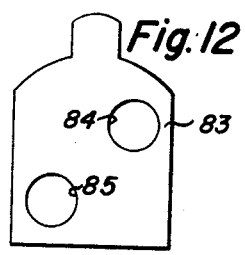
Figure 10:
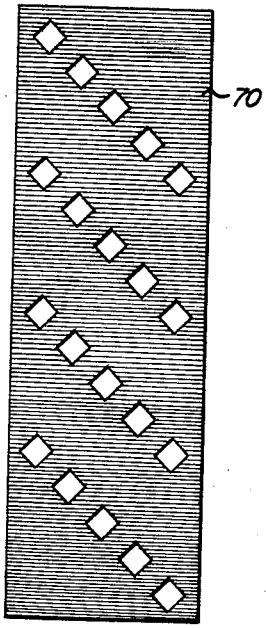
Fig. 10 illustrates the halftone screen used to produce the film shown in Fig. 9.

Figs. 9, 10 and 11 thus illustrate another embodiment of the invention, Fig. 12 being a slight modification of this embodiment. Fig. 9 shows the successive exposures on the film, Fig. 10 shows the form of screen and Fig. 11, the aperture plate.

Four rows of dots are exposed in the exposure area between the lines 71 and 72 in Fig. 9. These are orthogonal rows with respect to the screen pattern and are diagonal with respect to the direction of the film movement. The exposure frame is represented by a doubleheaded arrow 73 with an extension 74 to include the lower righthand corner dot which comes opposite the upper lefthand corner dot of the third or C exposure. The second exposure frame is represented by the arrow 76, and has an upper edge 78 which is even with a B dot. The first exposure is given through an aperture 81 and the second exposure through an aperture 82. Alternatively, the exposure plate 83 of Fig. 12 could be used in which case the alternating exposures use the apertures 84 and 85 so that the B exposures are through the same screen opening as was used for the A dot orthogonally displaced therefrom. To move the exposures up or down one full dot, one uses the aperture plate 80 of Fig. 11 and to move them orthogonally one uses the aperture plate 83 of Fig. 12. The effect is the same in both cases except for the edge columns of dots which are not utilized in practice anyway.

Figure 13:
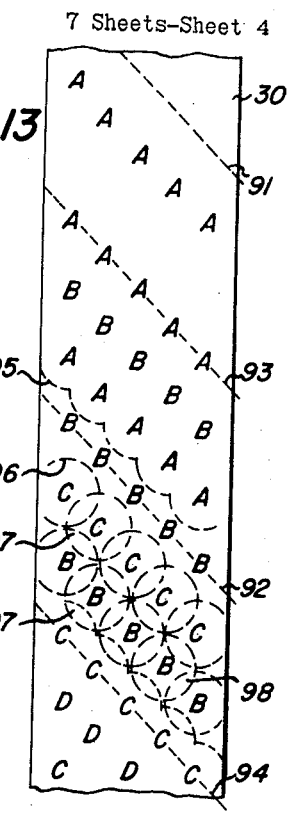
Figure 15:
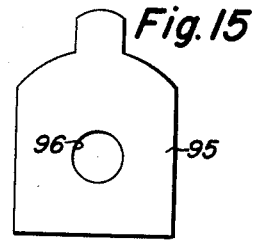
Figure 14:
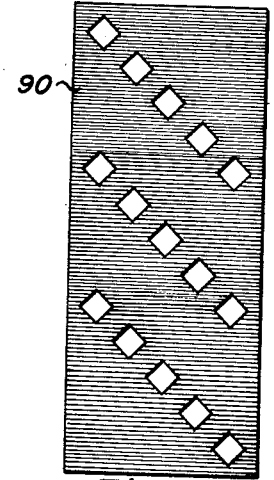

Figs. 13, 14 and 15 illustrate an embodiment with a decided advantage although the only difference from Figs. 9, 10 and 11 is the use of an exposure area including an odd number rather than an even number of rows. The A exposure is bounded by lines 91 and 92 and the B exposure is bounded by lines 93 and 94 half way between the edge lines of the preceding and succeeding exposures. Thus, there is no vertical displacement and, if one had to, one could use horizontally spaced apertures such as in Fig. 6, but they would be spaced a distance corresponding to a full dot. However (and here one has the real advantage of this embodiment), it is possible to use only a single aperture (or set of apertures) in the aperture plate 95 as shown at 96. This may be quickly visualized by reference to Fig. 13 when one realizes that the array of dots A between lines 91 and 92 is exactly the same as the array of dots B between the lines 93 and 94.

There is one peculiar advantage and one possible disadvantage to the arrangements shown in Figs. 9 and 13 as compared to the arrangement shown in Figs. 7 and 8. The advantage concerns the lines of demarcation between the A and C exposures for example. These lines are labeled 72 in Fig. 9 and 92 in Fig. 13.

Reference back to Fig. 7 will show that the effectiveness of the A and C exposures became zero exactly at the time of demarcation 33 so that there should be no interaction of the A and C exposures. However, if these A and C exposures did happen to extend slightly farther than this arbitrarily selected limit, it would be a slight overlap, although practically negligible as discussed above. In Fig. 13 the effect of the A exposures stops at the line 105 and the effect of the C exposures stops at the line 106 with a large gap between 105 and 106 so that there is no possibility of overlap of the A and C exposures at the line 92. The B exposures may extend into the A and C exposures, but this could not possibly be any different from the extension from the B exposures into two adjacent C exposures as indicated in areas 97 in Fig. 13. The areas 98 receive the two B exposures simultaneously. The areas 97 receive the B exposures first and the C exposures afterward. Thus, conceivably there might be some difference between the effect in the areas 97 and the effect in the areas 98. However, if this difference does exist, it is exactly the same for every orthogonal row across the screen and there is nothing peculiar about the areas near the line of demarcation 92. The areas near the line 105 receive A and B exposures in succession. The areas near the line 106 receive the B and C exposures in succession. The areas 97 receive the B and C exposures in succession. It is repeated that there is nothing peculiar about the exposures near the lines 105 and 106 as compared to the lines between any of the orthogonal rows of dots. Thus, Figs. 9 and 13 have the advantage of eliminating completely any trace of the line of demarcation provided the film advancing mechanism is precise, whereas the arrangement shown in Figs. 7 and 8 might possibly show an overlap between the A and C exposures, if the exposures exceed the optimum.

Figure 16:
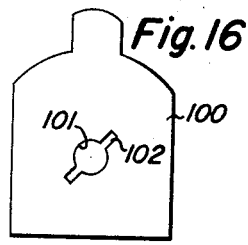

The possible disadvantage of the arrangement shown in Figs. 9 and 13 is the directional effect along the orthogonal lines 91, 92, 93 and 94 as compared to a direction at right angles thereto. The screens shown in Figs. 10 and 14 are directional in this sense. The exposures in the areas 97 tend, if anything, to give less effect than the simultaneous exposures in the areas 98. Accordingly, it is sometimes desirable to increase each of the exposures reaching the area 97. This is accomplished simply by the arrangement shown in Fig. 16 in which the aperture plate 100, having a single aperture 101, is provided with extensions or ears 102 so that the distribution of light behind each opening in the screen 90 is increased or enhanced in the orthogonal direction at right angles to the direction 92, for example. As pointed out in connection with Fig. 7, however, the difference in the effect of two simultaneous exposures and two successive exposures is not very great when the intensities of the two exposures are small as they are in the areas 97 and 98. Hence the refinement illustrated in Fig. 16 is not always necessary. Apertures with such ears could also be used in plates 80 and 83 of Figs. 11 and 12. On the other hand, elliptical dots have certain advantages in connection with tone reproduction, in which case it is preferable to omit the ears.

In all of the aperture plates illustrated (except in Fig. 16) the apertures are shown as circular since, in general, the present invention is not concerned with the shape of the aperture or its effect on the distribution of exposure within each dot. However, it is well known that the shape and size of the aperture can be varied and the effects of literally hundreds of different shapes have been discussed in the literature on halftone reproduction. These special effects may, of course, be utilized with the present invention if desired.

Figs. 17, 18 and 19 illustrate a preferred embodiment of the invention for use with a screen 110 which is particularly easy to manufacture accurately. Screen 110 has only ¼ the normal number of openings and two dots are exposed through each opening at each step. Apertures 111 and 112 are used for the A exposures and respectively produce dots $A_1$ and A. Apertures 113 and 114 are used for the B exposures and respectively produce dots $B_1$ and B. The result is similar to that illustrated in Fig. 8.

Figs 20 to 24 illustrate various types of screens, greatly enlarged.

In Fig. 20 the screen 31 corresponding to that of Fig. 3 includes apertures 41 covering only ⅛ of each element. An ordinary ruled halftone screen would have apertures in the areas 120 midway between the areas 41, but in the screen 31 these areas 120 have been rendered opaque. This is quite difficult to do since it requires diagonal ruling (horizontal or vertical in the drawing and preferably undulating in width) between the dots 41. An alternative arrangement is shown in Fig. 21 which has a similar distribution of openings in the screen but which is ruled in a direction which would be diagonal to the standard screen pattern. The width 122 of the rulings plus the width 123 of the dots is two times the element width of the ultimate screen. The width 122 need not bear any particular ratio to the width 123 since if smaller apertures are used, the screen spacing may be increased, but in general the ruling is about three times as wide as the aperture. The screen 121 is easier to produce than the screen 31 since only two rulings are required and these are at right angles to each other.

Fig. 22 shows a suitable arrangement for producing a screen of the type shown in Figs. 10 or 14. The screen 125 is ruled one way with rulings 126 three times the width of the desired aperture and ruled the other way with rulings whose width 127 equals the width of the desired screen openings. If one attempts to produce a corresponding screen with the square openings diagonal rather than orthogonal to the ultimate pattern as shown in Fig. 23, the rulings 131 are quite narrow each way and areas 132 have to be blanked out by some form of ruling at 45° to the rulings 131. As pointed out in connection with Fig. 20, this is a difficult operation and hence the screen shown in Fig. 22 is preferable to the one shown in Fig. 23. As pointed out in connection with Fig. 18, the screen 110 is relatively simple to make. This is illustrated in Fig. 24 wherein the orthogonal rulings are the same in both directions and have a width 135 about three times the width of the desired opening. Again, as shown in Fig. 25, it would be slightly more difficult to make a screen 136 with the same distribution of openings using diagonal rulings 137 plus some form of orthogonal ruling to remove the openings in the areas 138 left by such rulings 137.

It was pointed out above that the arrangements shown in Figs. 7 and 8 have an advantage over the arrangements shown in Figs. 9 and 13 in that there is no directional effect. Each B exposure is completely surrounded by A exposures or by C exposures or by A and C exposures in Fig. 7 or Fig. 8. This gives a degree of symmetry more complete than in Figs. 9 and 13 which have the directional effect discussed above. Figs. 26 to 28 illustrate an arrangement whereby this symmetry can be obtained using an exposure area whose ends are at 45° to the sides. If one uses a screen such as shown in Figs. 20 or 21 and the aperture plate 140 shown in Fig. 27, one can give the A exposures through the aperture 141 and the B exposures through the aperture 142. If one uses the screen 110 illustrated in Figs. 18 and 24 along with the aperture plate 145 illustrated in Fig. 28, the A exposures may be given through apertures 146 and 147 and the B exposures can be given through apertures 148 and 149. The net result is a screen very similar to that by the arrangement shown in Figs. 7 and 8. The lines of demarcation 150 between the A and C exposures just touch each other and the B exposures are symmetrically surrounded by A and C exposures.

The important feature of Fig. 13 which allowed the use of a single aperture 96 for making successive exposures was the combination of an odd number of rows of dots in the exposure area with the fact that the upper and lower edges of the exposure area 91 and 92 were parallel to an orthogonal row of dots. The arrangement shown in Figs. 29 and 30 shows exactly the same effect, but the orthogonal row of dots is at right angles to the strip of film rather than at 45°. Except for the special advantages gained by oblique arrangements as discussed later in connection with Fig. 33, the edges of the film are usually oriented parallel to one of the principal rows of dots, either an orthogonal row or a diagonal row with respect to the screen pattern. The ends of the exposure area can also be parallel to either type of principal row of dots, but the single aperture advantage can be obtained only when the ends of the exposure area are parallel to an orthogonal row of dots as in Figs. 13 and 29 (or when oblique systems are used as in Fig. 33 discussed below). The screen 150 of Fig. 30 is exactly the same as the screen 70 of Fig. 10, the screen 90 of Fig. 14, and the screen 125 of Fig. 22, except for the particular area and orientation of the area selected. That is, in Figs. 29 and 30 the film moves orthogonally relative to the screen pattern whereas in all of the previous figures the film moved diagonally relative to the ultimate screen pattern. In Fig. 29 the line of demarcation 151 corresponds to the line 92 of Fig. 13 and the final result is exactly the same as that produced by Fig. 13.

Since U.S. Patent 2,691,586, Yule et al., referred to above, discusses the advantages of having hypersensitized dots between the Clayden desensitized corners in the prescreened film therein described, one manner of incorporating this feature into the present invention will now be described, with reference to Figs. 31 and 32. Looking back to Figs. 3, 4 and 7, it is noted that prescreening by the Clayden effect requires the exposures through apertures 36 and 38 to be of short duration, so that points A, B, C, D, E etc. on the film 30 are desensitized. Fig. 31 shows a modified aperture plate 160. At the first step two exposures are given, the short duration one through aperture 36 as before and a lower intensity longer duration one through aperture 161. The exposure through aperture 36 produces desensitized points "A" on the film 30 as seen in Fig. 32 and the longer exposure through aperture 161 produces hypersensitized points "a" vertically between the points A. Similarly a long exposure (low intensity) through aperture 162 produces hypersensitized points "b" while the short exposure through aperture 38 produces desensitized points B.

Each of the systems described in connection with Figs. 3 to 30 are applicable to Clayden prescreening and each can be modified to add hypersensitizing in the manner illustrated in Figs. 31 and 32.

Fig. 33 is included to illustrate why the film does not have to move in a direction parallel to a principal row of dots. This turns out to be of considerable importance in practice since relatively large changes in screen orientation can be used to provide correction of extremely small errors in setting of the metering device.

Fig. 33 illustrates further that a single aperture or set of apertures can be used with a number of different systems wherein there is no directional effect as there is in Figs. 13 to 16. Thus Fig. 33 combines the advantages of Figs. 7 and 13.

In Fig. 33 there are 7 rows and 8 columns of dots. The number of columns does not matter. Any odd number of rows will work. In practice there may be several hundred rows. In the different systems illustrated in Fig. 33, the screen (and aperture plate if more than one set of apertures is used) is at various angles relative to the direction of movement of the film between steps, but for convenience of illustration the film is considered to be at different angles and the screen is considered fixed in space. One method of providing the angular adjustment of the screen relative to the film is illustrated in Fig. 3 in which the screen is rotated about a pivot 200 by a micrometer 201.

In the simplest case the edge of the film is at 170 and the screen opening which produces dot 171 (A), produces dot 172(B) at the next step (using the offset aperture) and dot 173(C) at the third step, etc.

When the film is oriented so that its edge is at 175, the same aperture and same screen opening successively produce dots 171(A), 172(B) and 176(C). The dot 176 is just one full dot over from dot 173. The illustration is concerned with dots near the edge of the film since this simplifies the discussion, but the exposures which are off the edge can be ignored since in practice the screen is several thousand columns wide.

Alternatively the film edge can be at any of the positions 180, 181, 182, as long as the screen opening for dot 171(A) moves for the C exposure to a dot such as 185, 186, or 187 which is an odd number of dots away from 173. This brings the screen opening corresponding to 171 to dots 190, 191 and 192(B) at the second step. In fact, the C exposures could be at dots an even number away from dot 173, provided the offset aperture is used for the B exposure.

If there are a very large (odd) number of rows in the exposure aperture (say 999 rows) the difference in angle between directions 175, 180, 181 and 182, etc., is very small. This has two or three effects. Three color prescreening of multilayer film is possible continuously (step-and-repeat) with angles very close to those desired in three color work. Secondly, the orientation of the screen can be selected at angles other than exactly orthogonal. A micrometer setting can be made after a trial run to get the best results without even knowing whether the run is going along 175 or 180 or 181 say.

Thirdly, the availability of this choice of orientations provides a precision adjustment to compensate for errors in the amount of movement at each step. The distance from dot 171 to dot 190 is a little greater than the distance from dot 171 to dot 172. Hence, if the film moving mechanism happens to move the film for each step very precisely but a little more than from dot 171 to dot 172, the screen can be turned to the next position or the next until there is a proper fit.

In Fig. 33, position 182 of the film edge is the orthogonal one discussed in connection with Fig. 13, but the two systems are quite different. There is no directional effect. Direction 182 still gives the prescreened film shown in Fig. 7 since it uses a screen such as shown in Fig. 20 or 21 whereas Fig. 13 results from the use of the screen 90 of Fig. 14.

If an even number of rows are used in the system shown in Fig. 33, a single aperture would put the B exposures in the same horizontal rows as the A exposures; hence vertically offset apertures of the type shown in Fig. 11 would be needed. In fact with a readjustment of the aperture plate for every exposure (which is of course quite undesirable) the screen can be oriented at any angle to the direction of motion of the film.

Taking the distance between adjacent "A's" in Fig. 33 as one full dot width or space, it is noted that the distance from dot 171 to dot 172 is ½ full dots down and ½ full dot over. Similarly dot 190 is ⅗ full dots over. Adjacent A's are along diagonal rows since the A's and B's together make the orthogonal rows. Thus the preferred embodiment has the following features. (1) A single aperture or set of apertures is used. (2) The screen is oriented so that the film moves at an angle $\theta$ to a diagonal row of dots where $$\tan \theta = \frac{X}{Y}$$

where X and Y are odd numbers. (3) The length of the exposure area is exactly $\sqrt{X^2+Y^2}$ times one full dot width and the film moves a distance between steps exactly equal to ½ this length.

For example, if $X=1$ and $Y=7$ the angle $\theta$ is the angle 176—171—173, the length of the exposure area is 171—176 and the distance moved is 171—172.

For another example if $X=3$ and $Y=7$ the angle $\theta$ is the angle 185—171—173, the length of the exposure aperture is 171—185 and the distance moved is 171—190.

The ends of the exposure area must not cut through any dots of course, and therefore the ends are parallel to an orthogonal row of dots. In Fig. 33, the ends of the exposure area is not at right angles to the sides (175, 180, 181 or 182). The ends are always parallel to the rows and an odd number of rows are included between the ends of the exposure area.

I claim:

1. The method of dot prescreening sensitive photographic sheet material in long strips without noticeable lines of demarcation with areas of the material which are to become centers of dots being hereinafter referred to as dot center areas, which method includes moving the material lengthwise past an exposure area adjacent to a sharp halftone screen, the motion being intermittent with a succession of time intervals during which the material is stopped with the section thereof which is in said exposure area overlapping 50% of the corresponding section for the preceding stopped-time interval, illuminating the exposure area through said sharp halftone screen during alternate stopped-time intervals from a first aperture set giving a uniformly distributed area of vignetted intensity spots of light at only approximately one half of the dot center areas, illuminating the exposure area through said sharp halftone screen during the other stopped-time intervals from a second aperture set which is effectively offset from the first the distance which produces spots midway between those of said one half.

2. The method according to claim 1 in which said sharp halftone screen has $$\frac{N^2}{2}$$

elements corresponding to dot centers per square inch and the screen is held spaced from said exposure area the spacing corresponding to the halftone spacing for a screen with $N^2$ elements corresponding to dot centers per square inch.

3. The method of dot prescreening sensitive photographic sheet material in long strips without noticeable lines of demarcation, with areas of the material which are to become centers of dots being hereinafter referred to as dot center areas, the screening being a rectangular pattern with the directions both of the rows which are orthogonal in the pattern and of the diagonal rows which are at 45° to the orthogonal directions being hereinafter referred to as principal directions, which method includes moving the material lengthwise past an exposure area adjacent to a sharp halftone screen having openings in rows, the separation of adjacent rows being twice the separation of adjacent openings in one row, the sides of the area approximately coinciding with the sides of the material and being parallel to a principal direction of openings of the screen, the effective length of said sides including an odd number of such openings and the ends of the area being parallel to an orthogonal direction of openings of the screen, the motion being intermittent with a succession of time intervals during which the material is stopped with the section thereof which is in said exposure area overlapping 50% of the corresponding section for the preceding stopped-time interval, illuminating the exposure area through said sharp halftone screen during each stopped-time interval with light distributed in an odd number of alternate rows of vignetted intensity spots of light, the rows of dot center areas exposed by each illuminating being midway between the rows of the preceding and succeeding illuminatings.

4. The method according to claim 3 in which said sharp halftone screen has $$\frac{N^2}{2}$$

elements corresponding to dot centers per square inch and the screen is held spaced from said exposure area the spacing corresponding to the halftone spacing for a screen with $N^2$ elements corresponding to dot centers per square inch.

5. The method of dot prescreening sensitive photographic sheet material in long strips without noticeable lines of demarcation, with areas of the material which are to become centers of dots being hereinafter referred to as dot center areas, the screening being a rectangular pattern with the directions both of the rows which are orthogonal in the pattern and of the diagonal rows which are at 45° to the orthogonal directions being hereinafter referred to as principal directions, which method includes moving the material lengthwise past a rectangular exposure area adjacent to a sharp halftone screen, the sides of the area approximately coinciding with the sides of the material and being at an angle $\theta$ greater than zero to the direction of said diagonal rows, the length of said sides being equal to $\sqrt{X^2+Y^2}$ times the distance between adjacent dot center areas, X and Y being odd integers and $\tan \theta$ being equal to $$\frac{X}{Y}$$

and the ends of the areas being parallel to the direction of an orthogonal row of dot center areas, the motion being intermittent with a succession of time intervals during which the material is stopped with the section thereof which is in said exposure area overlapping 50% of the corresponding section for the preceding stopped-time interval, illuminating the exposure area through said sharp screen during each stopped-time interval with light distributed in an odd number of alternate rows of vignetted intensity spots of light, the rows of dot center areas exposed by each illuminating being midway between the rows of the preceding and succeeding illuminatings.

6. The method according to claim 5 in which said sharp halftone screen has $$\frac{N^2}{2}$$

elements corresponding to dot centers per square inch and the screen is held spaced from said exposure area the spacing corresponding to the halftone spacing for a screen with $N^2$ elements corresponding to dot centers per square inch.

References Cited in the file of this patent

UNITED STATES PATENTS

| | | |
|---|---|---|
| 551,266 | Deville | Dec. 10, 1895 |
| 1,426,996 | Kitsee | Aug. 22, 1922 |
| 1,575,408 | Bassani | Mar. 2, 1926 |
| 2,211,345 | Murray | Aug. 13, 1940 |
| 2,478,443 | Yule et al. | Aug. 9, 1949 |